Nov. 27, 1928.
H. P. KRAFT
TIRE VALVE
Filed May 10, 1920
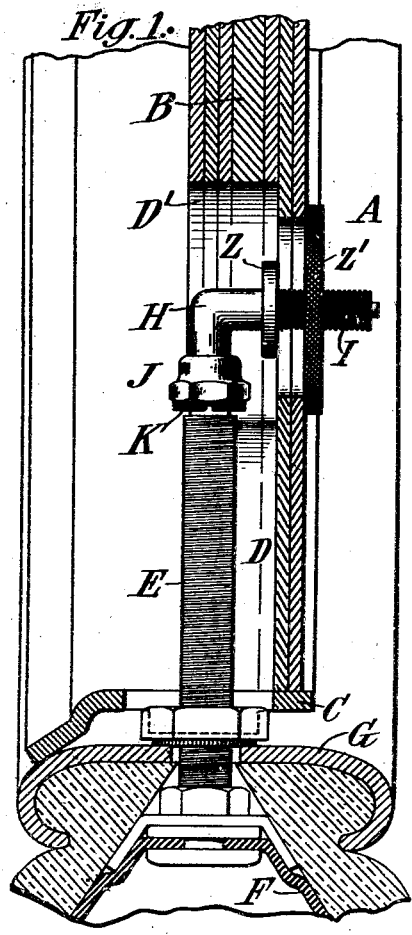
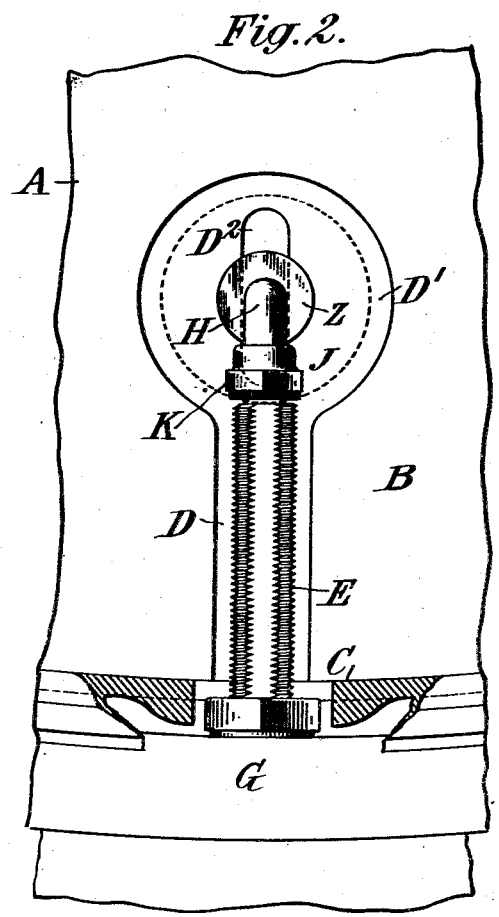
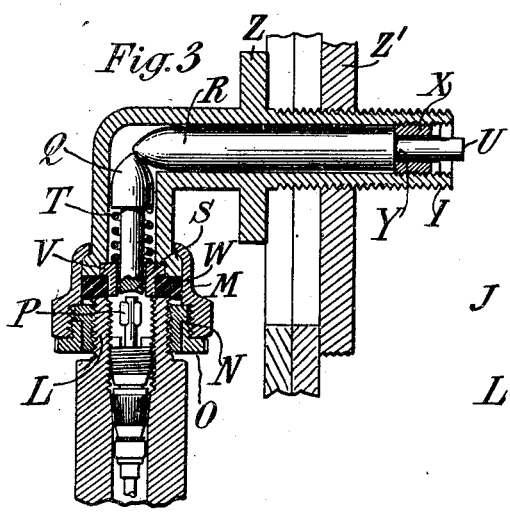
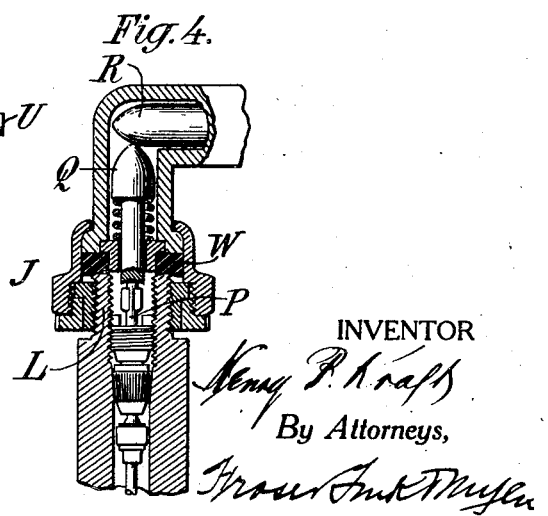
INVENTOR
By Attorneys, Patented Nov. 27, 1928.

1,693,084

UNITED STATES PATENT OFFICE.

HENRY P. KRAFT, OF RIDGEWOOD, NEW JERSEY; EDGAR J. PHILLIPS AND EARL A. DARR EXECUTORS OF THE WILL OF HENRY P. KRAFT, DECEASED.

TIRE VALVE.

Application filed May 10, 1920. Serial No. 380,024

This invention relates to valves for pneumatic tires or the like and aims to provide certain improvements therein.

The invention is particularly directed to a valve adapted for use on wheels of the disk type. In this type of wheel, there being no spokes, provision must be made for gaining access to the end of the tire valve for inflation, deflation, and gauging, which operations are easily accomplished in the ordinary wood or wire wheel by reason of the spaces between the spokes which permit the pump coupling or gauge to be freely applied to the end of the valve.

According to the present invention, I provide a fitting which is applicable for use in connection with wheels of the disk type, which fitting is angular in form and which, in effect, constitutes a continuation of the valve, one end of the fitting being connected with the valve, and the other preferably projecting through the disk in a direction which is substantially parallel to the wheel axis. Preferably, this fitting is provided with means for depressing the tire valve pin whereby gauge readings can easily be taken by applying the gauge to the free end of the fitting, and whereby the operation of deflating may be easily accomplished. The invention includes certain other features of improvement which will be hereinafter more fully described.

Referring to the drawings which illustrate the invention as applied to a disk wheel constructed of wood, Figure 1 is an elevation of the invention, the wheel being shown in diametrical section.

Fig. 2 is an elevation at right angles to Fig. 1, certain parts being broken away.

Fig. 3 is a sectional view through the valve, part of the wheel disk being shown in section.

Fig. 4 is a view similar to Fig. 3 showing the parts in deflating or gauging position.

Referring to the drawings, let A indicate the wheel as a whole which is shown as comprising a central web or disk B, the periphery of which has secured to it, a metallic rim C. The disk B is shown as constructed of laminated wood, and while it is illustrated as displaced somewhat to one side of the wheel, it, nevertheless, occupies the central portion of the wheel so that it must be recessed as shown at D (Figs. 1 and 2) to receive the tire valve E.

The valve E as shown, comprises a standard Schrader valve fixed to the inner tube F, passing through a suitable hole in the demountable rim G and fixed rim C. It is desirable from the standpoint of appearance, and for other considerations, that the exterior of the wheel shall be as continuous as possible. For this reason, it is advisable to arrange the wheel so that the recess D is on the interior of the wheel, or that side which faces the car.

According to the present invention, I provide a fitting H which preferably is detachably secured to the valve E and which also preferably is of right angled construction so that when secured to the radially arranged valve, its operative end I extends transversely to the disk, or parallel with the axis of the wheel. The projecting end I is best screw-threaded to receive the ordinary pump coupling, and the attaching end J is best provided with a union K for connecting it with the valve nipple L. The union shown comprises a swivel member M (see Fig. 3) provided with a detachable nut N held in place by a threaded sleeve O. This construction of union is not claimed herein since it forms the subject matter of a pending application filed by me.

According to the preferred form of the present invention, I provide means extending to the end I of the fitting by which the pin P of the tire valve (Figs. 3 and 4) may be depressed in order that the valve may be placed in communication with the fitting for purposes of deflation or gauging. The means I prefer to employ comprise a pair of members Q, R, these members constituting in effect, a rod or pin leading from the valve pin to the end of the fitting. The member Q is preferably constructed as a pin shaped member, the lower end of which is best concaved slightly as shown at S to engage the tire valve pin P and is best provided with a spring T, which normally holds the pin Q in its elevated position. The upper part of the pin Q is formed with a head which is preferably obtusely pointed and which is adapted to engage, and be engaged by, a similar head formed on the pin R. The latter may comprise a cylindrical member having a reduced portion U which normally extends to a point slightly beyond the end I of the fitting. The pointed ends of the two pin members comprise in effect, wedging surfaces by means of which, when the extension U is pressed inwardly, the pin member Q is pressed downwardly to open the tire valve. By forming the abutting ends of the two pin members, symmetrically pointed, as shown, these members may turn in any direction without affecting their operative connection. The head of the member Q affords a suitable shoulder against which the upper portion of the spring T abuts while the lower end of the spring best bears against a detachable sleeve V which may be held in place by the packing washer W of the fitting. This permits the pin member Q to be easily removed or replaced by removing the nut N. The pin member R is best held in position by a screw-threaded sleeve X which bears against a shoulder Y formed between the body of the member and the reduced extension U.

The fitting H preferably has means for clamping it to a portion of the disk B, such means being shown as a fixed flange Z and a disk nut Z', the first bearing against the inner face of the web and the second being adjusted on the exterior of the wheel in order to clamp the fitting in place on the disk.

Preferably, the recess D formed in the disk is enlarged as shown at D' and a slot $D^2$ is best provided which passes through the disk B, the slot being elongated radially as best seen in Figs. 1 and 2.

In applying the fitting to the wheel, the demountable rim G is first adjusted in place with the valve E projecting inwardly through the fixed rim C. The fitting is then applied from the inner side of the wheel and the coupling J screwed down to make a leak-tight joint between the fitting and the valve nipple. In so doing, the right angled part of the fitting may slide easily in the slot $D^2$. This slot also provides sufficient room for application of the fitting to valves of different degrees of projection through the rim. When adjusted in place, the flange Z being of greater diameter than the width of the slot $D^2$, bears against the inner face of the recessed portion of the disk and the end I of the fitting projects through the disk outwardly to the exterior. The nut Z' is then applied to the end I of the fitting and screwed down tightly. This holds the fitting and valve in rigid position.

In operation, if it is desired to deflate the tire, it is only necessary to press inwardly the end U of the pin member R by which action the pin member Q is depressed and the valve opened. So also, if it is desired to determine the pressure in the tire, a gauge of a standard type may be pressed on the end I of the fitting, the gauge depressing the pin R. The pin R is normally maintained in its extended position by the spring T, which, in forcing the pin member Q upwardly, moves the pin R outwardly. An ordinary valve cap may be applied to the end I of the fitting in order to prevent any leakage if the tire valve fails to seat properly or becomes injured. The fitting preferably does not maintain the tire valve in its depressed position, the latter remaining closed until the pin R is pressed inwardly.

While I have shown and described one form of the invention, it will be understood that I do not wish to be limited thereto, as various changes may be made therein without departing from the spirit of the invention. While the pin members Q and R are shown as separate members, it will be understood that these may be connected in any manner which will permit the movement of the extremity of the pin R to be transmitted to the valve pin. Other changes may also be made if desired.

What I claim is:—

The combination with a wheel having a disk, an elongated slot through said disk, and a tire valve having an angled fitting passing through said slot, said angled fitting having means for clamping said disk, said clamping means comprising a fixed disk on the angled fitting and a screw-threaded disk adapted to engage a thread on the angled fitting and clamp the wheel disk between the two.

In witness whereof, I have hereunto signed my name.

HENRY P. KRAFT.